April 11, 1939. H. O. EIANE 2,153,713
GRASSHOPPER TRAP
Filed April 6, 1936 2 Sheets-Sheet 2
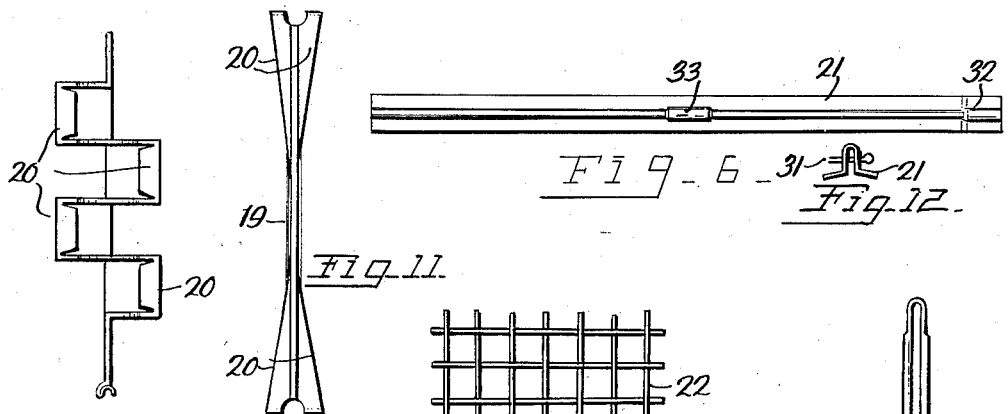
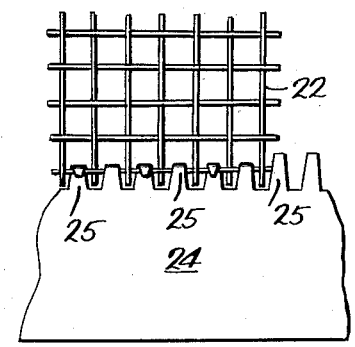
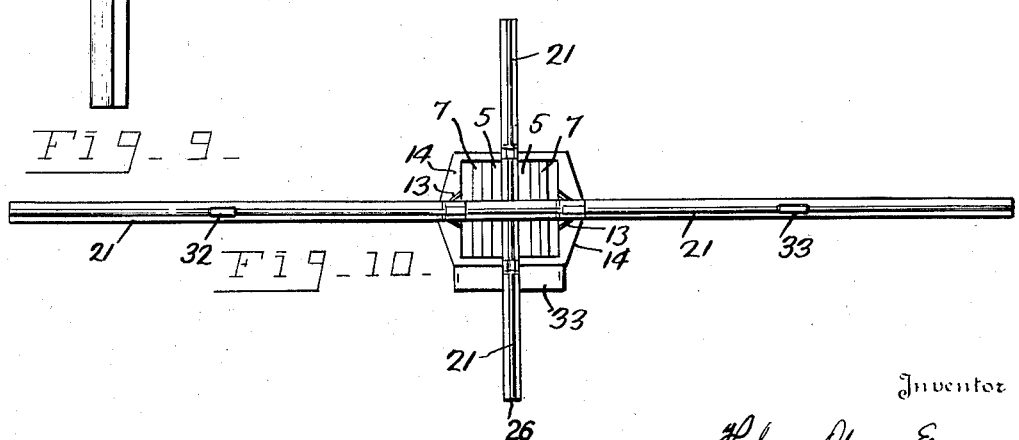

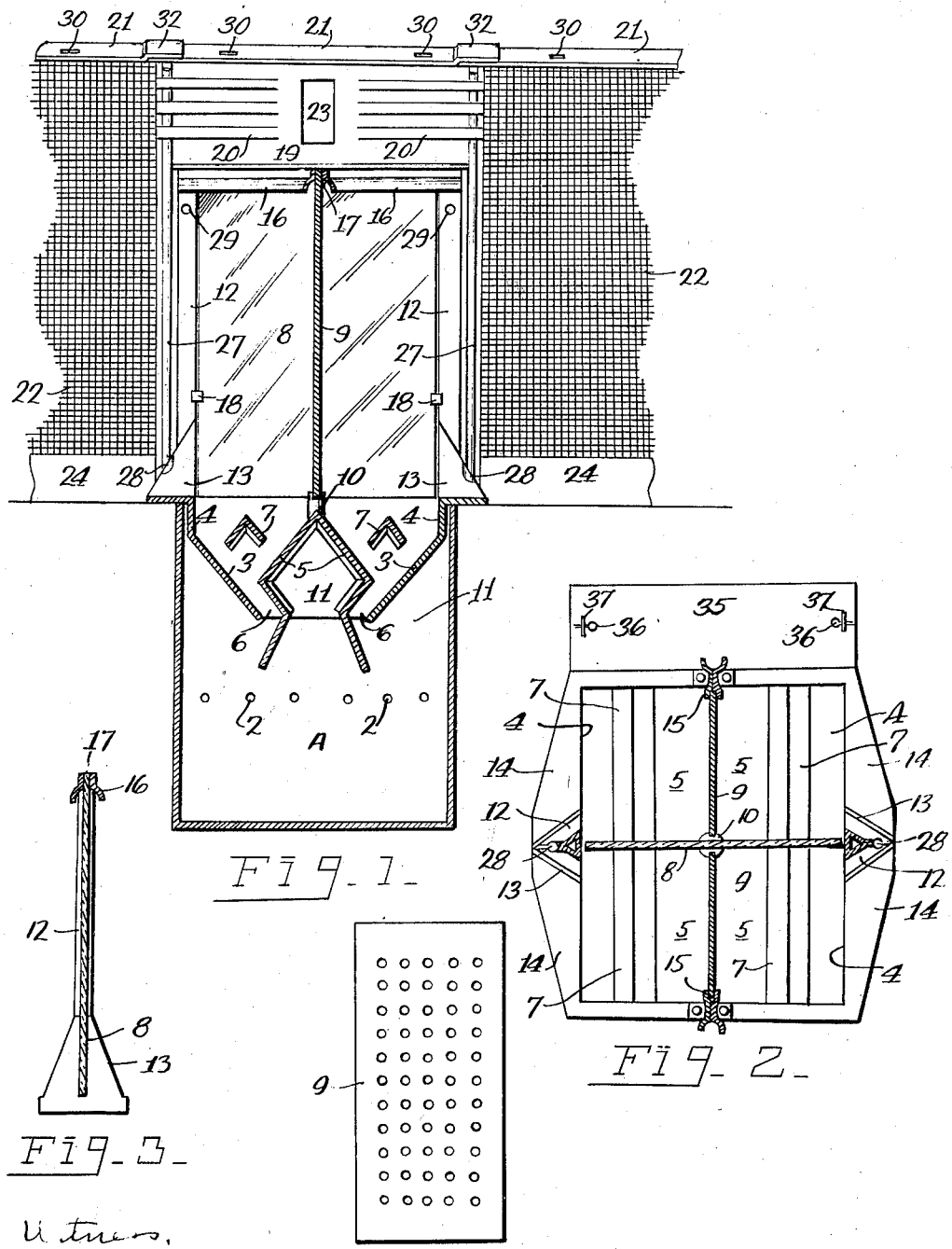

Patented Apr. 11, 1939

2,153,713

UNITED STATES PATENT OFFICE 2,153,713

GRASSHOPPER TRAP

Halvor Olsen Eiane, Washington Island, Wis.

Application April 6, 1936, Serial No. 72,871
In Canada April 6, 1935

4 Claims. (Cl. 43—107)

My invention relates to improvements in a grasshopper trap, and the objects of my improvements are: First, to provide a trap capable of catching grasshoppers from four different directions on the ground and likewise from as many points above the ground: Second, to provide a trap with mouths and throats capable of frustrating all efforts of imprisoned grasshoppers to escape: Third, to utilize the main leads as ordinary farm fences in addition to their duty of leading grasshoppers to the traps, by running the leads in a straight line.

I attain these objects by the use of trap and leads constructed in accordance with the principles of my invention hereinafter more fully described and claimed, and which bear in many respects resemblance to my earlier application for patent on a Grasshopper trap, filed April 11, 1934, Serial No. 120,032, now Patent No. 2,108,599 of February 15, 1938.

Fig. 1 represents a partly sectional side elevation of the trap, showing in sectional view the underground pit-box and the overhead mouths and throat openings.

Fig. 2 is a top plan view of the trap with the leads removed, and showing in cross sectional view the main and auxiliary baffle plates and their supports.

Fig. 3 is an inside edge view of the main baffle plate and one of its upright supports, showing the baffle plate and part of the upper support in sectional view.

Fig. 4 is a side view of a perforated auxiliary baffle plate.

Fig. 5 is an end view of a corrugated baffle plate, which in assembled position is superposed on the main baffle plate.

Fig. 6 is a top plan view of a guard rail.

Fig. 7 is a fragmentary side elevation of a lead, showing the method of joining the woven wire-fence and the lower guard strip binding together.

Fig. 8 shows a bifurcated support for holding the lead in an upright position.

Fig. 9 is a side elevation of a lead terminal.

Fig. 10 is a top plan view of a complete trap.

Fig. 11 is a top plan view of the superposed baffle plate.

Fig. 12 is an end view of a lead guard rail.

A, in Fig. 1 is an underground pit-box, constructed of metal or any suitable material, and set in a pit dug in the ground. 2 are overflow holes for keeping a fixed water level in the pit-box A. The slanted plates 3 forming a funnel-shaped opening, are provided with vertical walls 4 at their upper edges, designed to give the grasshoppers entering the opening an initial plunge.

A central ridge having slanted roof-shaped sides 5 divides the opening into two separate mouths, giving each side its separate indirect throat opening 6, which communicates with the interior of the pit-box A.

A pair of roof-shaped guard plates 7 cover the throat openings 6, whereby all attempts at escape by imprisoned grasshoppers are frustrated, even when the pit-box A is about filled with the insects, and at the same time the guard plates present a far less awe-inspiring mouth opening to prospective victims.

The main baffle plate 8 is transparent and preferably made of clear glass, but the auxiliary baffle plates 9 are made of perforated galvanized sheet iron having a smooth margin on all sides, over which no grasshoppers can climb.

A pedestal 10, mounted on the central ridge 5 provides a common support for both main and auxiliary baffle plates.

The central ridge 5 is secured at its opposite ends to the vertical side walls 11 in the mouth opening of the trap, and the roof-shaped guard plates 7 are likewise secured to the same walls.

Referring to Fig. 1, it will be noted that the lower edge of the transparent baffle plate 8 is even with the upper edge or rim of the mouth opening of the trap, thus providing large indirect passages or openings underneath the transparent baffle plate to induce grasshoppers afraid to jump against the plate to try to crawl across the mouths underneath the plate.

The two main supports 12, supporting the main transparent baffle plate 8 in upright position, are provided with triangular faced feet or enlargements 13 at their lower ends, so as to provide vertical wall spaces between the platforms 14 and the baffle plate 8 in order to induce grasshoppers ready to cross the trap to make a jump against said baffle plate.

A pair of vertically disposed supports 15, support the two auxiliary baffle plates 9 in an upright position.

A cross-shaped frame 16 binds the four upright supports 12 and 15 together at their upper ends. Slots 17 are provided in the crossed support 16 through which the baffle plates 8 and 9 are lowered into their respective places. A pair of brackets 18, secured to the upright supports 12 keep the lower portion of the transparent baffle plate 8 firmly in position.

Referring to Figs. 1, 5 and 11, it will be seen that a corrugated baffle plate 19 is mounted directly above the transparent baffle plate 8 and is provided with a plurality of laterally disposed corrugations or run-ways 20 which taper off to a vanishing point toward the center of the plate.

This superposed baffle plate is designed to take care of grasshoppers moving back and forth under the eaves of the guard rails 21 seeking an opening to get through the main leads 22 and upon discovery of the opening 23 in the baffle plate 19 they naturally will try to get through there, but as they get near to this opening they will lose their balance and fall into the mouths of the trap, and from there pass into the pit-box A.

The lower guard strip bindings 24 are joined to the woven wire-fence leads 22, by the teeth 25 being bent around mesh wires in alternate style from opposite sides, as more clearly shown in Fig. 7.

Grasshoppers moving on the ground naturally regard the leads with their guard strip bindings as barrier walls, and arriving at the trap with the transparent baffle plate 8 down to the ground line, they of course see it as an opening in the barrier wall and seek to get through. Some will jump against the transparent baffle plate, and other less active will try the simple method of crawling underneath the baffle plate—only to wind up their journeys in the pit-box A.

The auxiliary leads 26, and the auxiliary baffle plates 9, serve to check the movements of grasshoppers moving along the main leads 22, and thus co-operate in transverse relation to the main leads in directing their movements toward the mouths of the trap.

The auxiliary leads 26 are set at right angles to the main leads 22, and are similar in construction to the main leads except being considerably less in height so as to frustrate efforts of grasshoppers who fly out from under the eaves of the auxiliary guard rails 21 to gain enough elevation to clear the guard rails of the main leads which they apparently understand to take advantage of when the main and auxiliary leads are constructed of the same height.

Each lead section has end terminals 27, made of sheet metal and pressed flat at their upper ends so as not to require any undue enlargement in the ridges of the guard rails 21.

The end terminals 27 are placed in holes 28 at the feet of the supporting frames 12, and tied by wires through holes 29 to the upper ends of the supporting frames 12.

The guard rails 21 are provided with slotted holes 30, through which cotter pins 31 are inserted and passed through meshes in the woven wire-fence leads 22, to retain the rails in position.

Each section of guard rail is provided with an enlargement 32 to overlap the end of the next guard rail, and in the middle part of the rail is another enlargement 33 to accommodate the upper bend of the bifurcated support 34.

The support 34 maintains the lead 22 in an upright position between its legs.

A cover plate 35, held in position by a cotter pin 36 passed through ears 37, is provided for the purpose of removing imprisoned grasshoppers from the pit-box A.

All parts of the trap except the main transparent baffle plate, are made of zinc or galvanized iron, and preferably joined together by means of spot welding.

Asphalt coating in addition to galvanizing may be used where any parts of the trap or leads are in contact with the soil, so as to lengthen their life.

I do not intend to limit my invention to the exact description and drawings as herein given, as many changes can be made without departing from the principles involved.

Having thus described my invention, what I claim as new and desire to secure by Letters Patent is:

1. A grasshopper trap having an underground pit-box, a pair of open overhead mouths, a pair of indirect slot-shaped throat openings communicating between said mouths and the interior of said pit-box, vertically disposed frames above said mouths, a main transparent baffle plate mounted in said frames, a pair of auxiliary perforated metallic baffle plates arranged transversely to said main baffle plate and mounted in said frames, and main and auxiliary leads connected to and extending from said main and auxiliary baffle plates in continuation therewith as lead barrier walls.

2. In a grasshopper trap, an underground pit-box, a pair of open overhead mouths with slanted mouth plates, a pair of indirect slot-shaped throat openings communicating with the interior of said pit-box, a pair of roof-shaped guard plates fixed above said throat openings, vertically disposed frames above said mouths, a main transparent baffle plate mounted centrally above said mouths in said frames, a pair of perforated auxiliary baffle plates arranged at right angles to said main transparent baffle plate and mounted in said frames, and main and auxiliary leads attached to said frames in relative corresponding directions as said main baffle plate and said auxiliary baffle plates respectively.

3. The combination of a grasshopper trap having an underground pit-box, a pair of overhead mouth and throat openings into said pit-box, vertically disposed frames above said mouths, a transparent baffle plate mounted in said frames, a pair of triangular faced feet at the lower ends of said frames, a plurality of platforms having vertical walls at their inner edges and toward said baffle plate fixed at a predetermined distance at opposite sides of said baffle plate, and main and auxiliary leads connected to said trap in transverse relation to each other.

4. The combination in a grasshopper trap, comprising an underground pit-box, a pair of overhead mouths, a pair of slot-shaped indirect throat openings into said pit-box, a vertically disposed frame above said mouths, a main transparent baffle plate mounted in the frame, a pair of perforated auxiliary baffle plates mounted in said frame in transverse relation to said main plate, an indirect passage from side to side under said transparent baffle plate, a plurality of platforms provided with vertical walls at their inner edges set a predetermined distance at opposite sides of said main baffle plate, and a plurality of main and auxiliary leads composed of woven wire-fencing provided with upper guard rails and bottom guard strip bindings, extended as connected and continuous lead barrier walls with said baffle plates across the mouth of said trap, all substantially as shown and described.

HALVOR OLSEN EIANE.